June 23, 1931.                J. E. DESMOND                1,811,042
                            SPRINKLING APPARATUS
                        Filed May 20, 1929    2 Sheets-Sheet 1
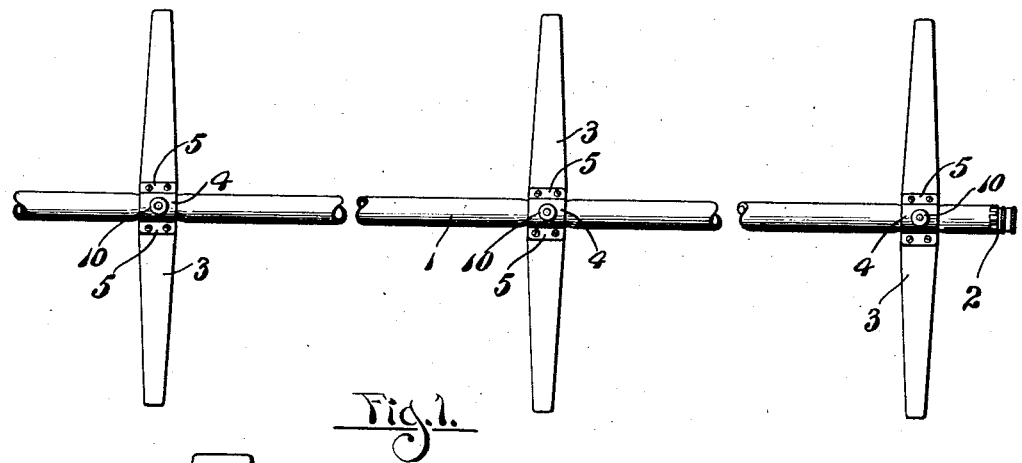
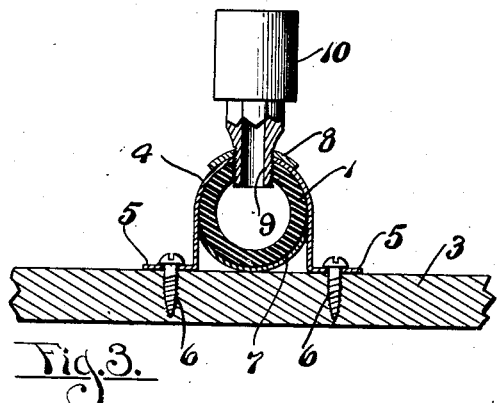
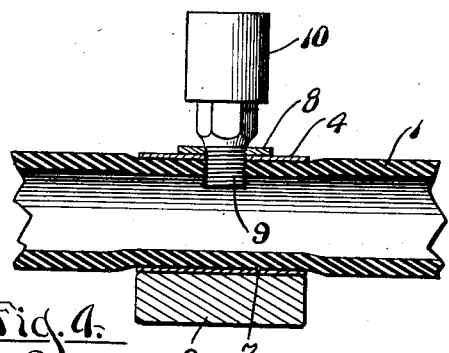
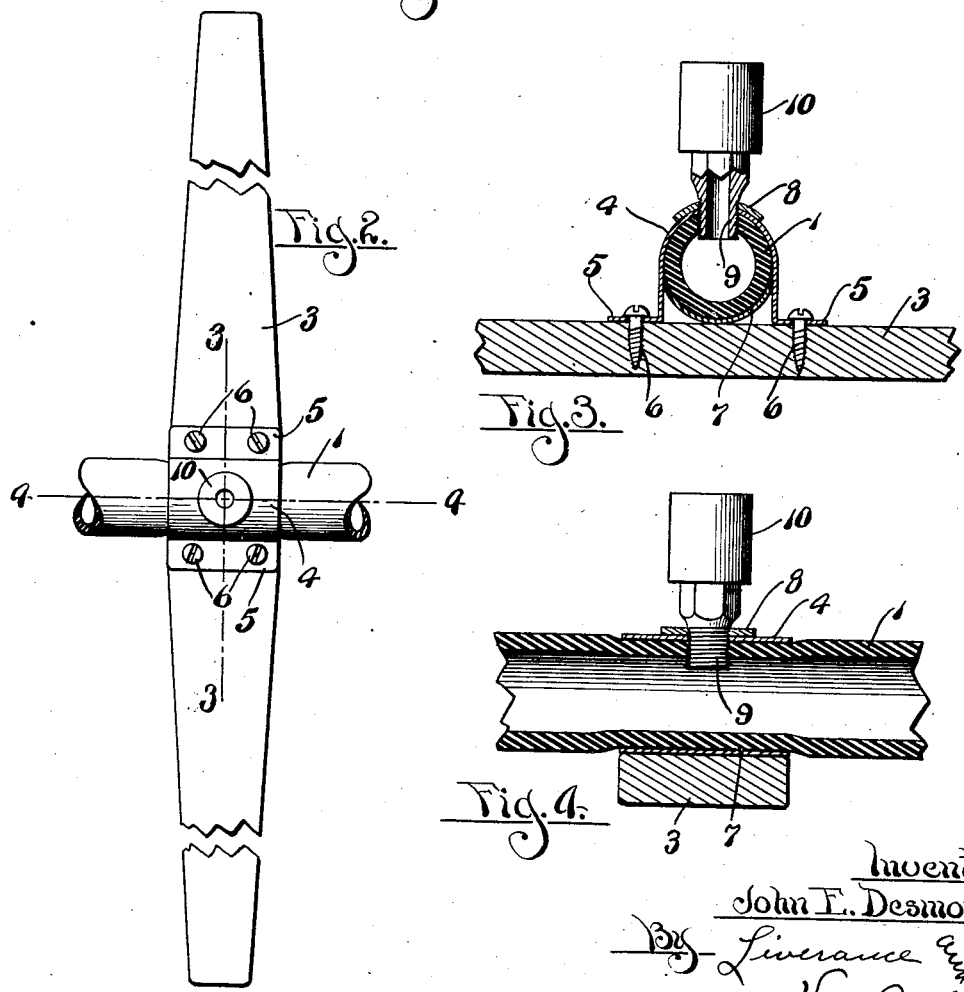

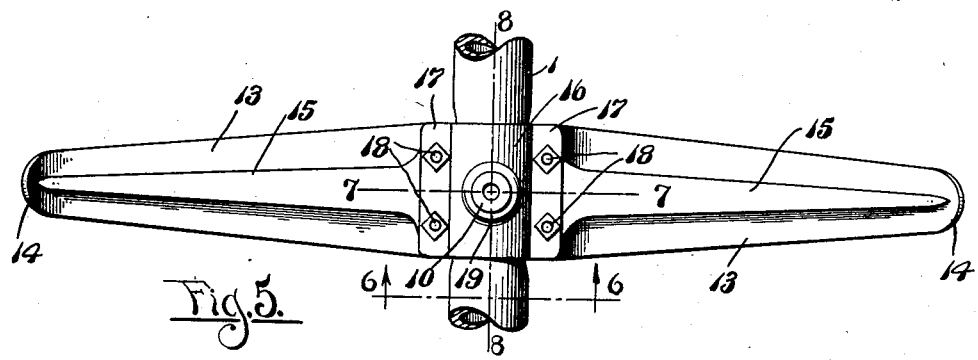
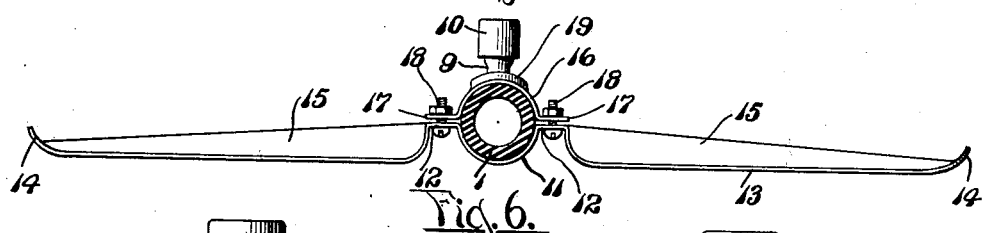
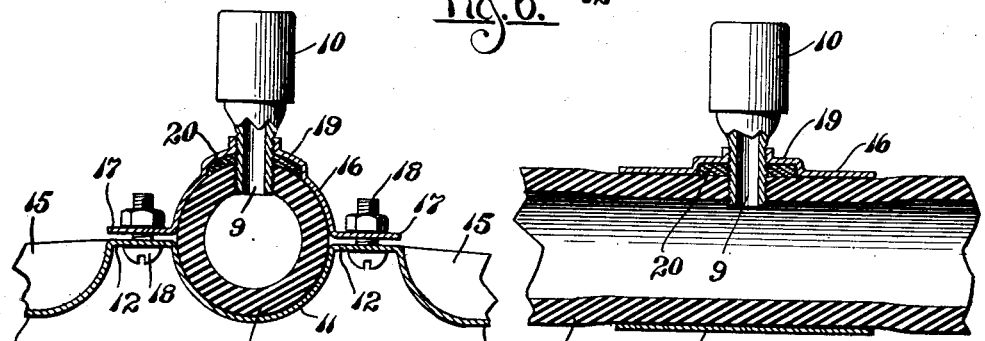
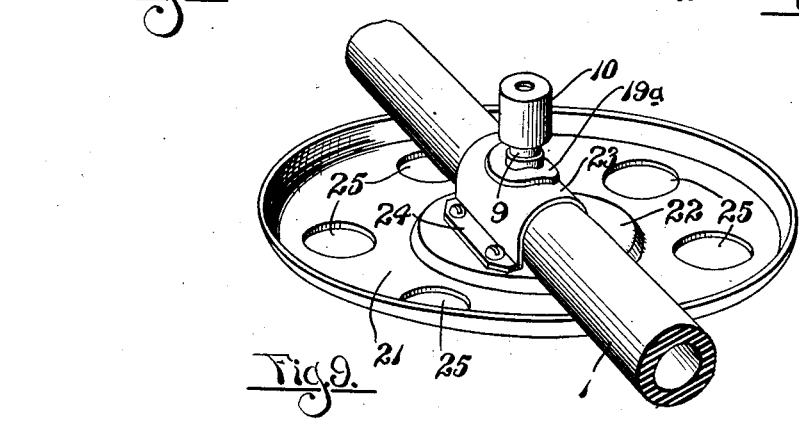

Patented June 23, 1931

1,811,042

UNITED STATES PATENT OFFICE

JOHN E. DESMOND, OF MUSKEGON HEIGHTS, MICHIGAN, ASSIGNOR, BY MESNE ASSIGNMENTS, TO DESMOND MANUFACTURING COMPANY, OF MUSKEGON, MICHIGAN, A CORPORATION OF MICHIGAN

SPRINKLING APPARATUS

Application filed May 20, 1929. Serial No. 364,483.

This invention relates to a sprinkling apparatus, particularly adapted for sprinkling lawns, use being made of a plurality of sprinkling units at spaced apart distances in the length and at the upper side of a hose through which the water is carried from the water main.

It is an object and purpose of the present invention to provide a very simple and easily applied sprinkling unit at any desired number of places as may be needed in the length of a hose, mounted the same so that the hose may be simply and easily moved to different positions over a lawn, and when the sprinkling operation is done the hose may be wound into a coil so as to occupy little space when not in use. The construction embodying my invention is very practical and efficient and can be economically produced so as to be available at low cost.

An understanding of the invention my be had from the following description taken in connection with the accompanying drawings, in which, Fig. 1 is a plan showing a plurality of the sprinkling units attached in spaced relationship to each other in the length of a hose.

Fig. 2 is an enlarged plan of one of the units connected to a hose.

Fig. 3 is a vertical section on the plane of line 3—3 of Fig. 2.

Fig. 4 is a vertical section on the plane of line 4—4 of Fig. 2.

Fig. 5 is a plan view, similar to Fig. 2, showing a different form of the construction.

Fig. 6 is a vertical section on the plane of line 6—6 of Fig. 5.

Fig. 7 is an enlarged vertical section substantially on the plane of line 7—7 of Fig. 5.

Fig. 8 is a vertical section on the plane of line 8—8 of Fig. 5, and

Fig. 9 is a perspective view showing a still further form of the invention.

Like reference characters refer to like parts in the different figures of the drawings.

The hose 1 may be of any desired length and its outer end is closed by any suitable fixture 2 to which a rope may be secured for moving the hose with the sprinkling units connected therewith to different positions on the lawn without first turning off the water, as the length of rope used may be sufficient to place one beyond the range of the outermost sprinkler unit.

Each sprinkler unit in the form shown in Figs. 1 to 4 inclusive comprises a flat bar 3, preferably of wood, which is placed underneath the hose at points where the units are to be attached. A U-shaped clamping stirrup 4 is passed over the hose and its ends have outturned ears 5 through which screws 6 are inserted, driving into the bar 3 to provide a permanent connection of the hose to the bar. In practice the underside of the hose is equipped with a curved metal shoe 7, best shown in Fig. 3, to keep the hose from flattening by reason of the pressure exerted thereon by the clamping stirrup 4.

At the upper outer side of the stirrup a curved metal plate 8 is permanently secured as by welding or other equivalent fastening, and through this plate, the stirrup 4 and the adjacent portion of the hose an opening is made, which in the parts 4 and 8 is interiorly threaded. A sprinkler head, provided with a threaded stem, 9 is screwed through said opening and the head 10 is provided with the usual passages for the distribution of water at angles to the vertical passage in stem 9 as it passes from the hose and through the steam thereto.

In Figs. 5 to 8 inclusive a somewhat different mechanical embodiment of the invention is shown. The bars 3 of wood are replaced by bars pressed from sheet metal, formed midway between their ends with semi-cylindrical seats 11 in which the hose 1 may be located, the metal extending outwardly at each side of the seat to provide horizontal ledges 12 from which the two ends or arms 13 of the bar extend, the same being provided with upwardly curved extremities 14 and reinforced and strengthened by longitudinal ribs 15 which extend substantially the full length and centrally of the arms.

A clamp 16 of sheet metal passes over the hose and is associated with each of the metal bars described, having outwardly extending flanges 17 to lie directly over the ledges 12 to which they are secured by short bolts 18. The clamp 16 at its upper side is embossed or pressed outwardly to form the circular embossment 19 underneath which and above the upper side of the hose 1 is located a washer 20. The sprinkler head 10 with its attaching neck 9 is secured to the clamp 16 threading through the upper side thereof and centrally through the embossing 19 so as to pass through the washer 20 and through the hose at its upper side, as shown in Figs. 7 and 8.

In Fig. 9 a still further form of the invention is shown. With each of the sprinkler units a circular pan 21 of sheet metal is used over which the hose passes, the bottom of the pan having a centrally disposed upraised section 22 to raise the hose above the rim of the pan. The hose is attached to the pan by means of a U-shaped stirrup 23 of sheet metal which has outwardly extending flanges 24 bearing upon the section 22 to which it may be secured, using bolts similar to the bolts 18. This stirrup likewise has an embossing 19a, similar in all respects to the embossing 19 previously described, to house the washer 20 thereunder. Openings 25 may be made through the bottom of the pan in order that water may not collect in the pan during sprinkling. This construction, as well as the others, may be readily moved over the ground by pulling on the end of the hose.

With the constructions as described, wherein the sprinkler units are located at desired distances apart in the length of the hose and as many of them as will take the full capacity of water which the hose can carry, the lawn may be sprinkled and a considerable area served at one time. When this area has been sprinkled as much as may be desired, the hose is readily moved to a different position and this may be repeated until the entire area of the lawn has been properly sprinkled. The attachment of the units to the hose is very simply and easily done. The sprinkler units themselves are of simple construction, economical to make and the production cost of the units sufficient to supply a hose is low. The upturned ends 14 at the ends of the bars are an insurance against digging into the ground while the use of the washer 20 is an insurance against leakage around the stem 9 as the water pressure against the hose adjacent the stem serves to compress the washer and force it into very snug engagement with the stem 9, thus eliminating leakage. Many other modifications than those illustrated and described may be resorted to without departing from the invention defined in the appending claims, and the invention is not to be limited to any particular and specific construction shown but is to comprehend all forms of structure coming within the scope of said claims.

I claim:

1. In a sprinkling apparatus, a length of hose, a base, a rigid metal member clamped on said base against the hose, said member having a threaded opening therethrough, said hose having an opening in alinement with the said threaded opening and a sprinkler head having a threaded stem screwed through the threaded opening and into the hose whereby the hose is kept from collapsing inwardly.

2. An apparatus as set forth in claim 14 in which the metal member is embossed outwardly concentrically around said threaded opening therethrough, and a resilient washer is inserted in said embossment, said washer being compressed toward the metal member by the action of the threaded stem thereon.

In testimony whereof I affix my signature.

JOHN E. DESMOND.